US012596265B2

(12) United States Patent
Parker

(10) Patent No.: US 12,596,265 B2
(45) Date of Patent: *Apr. 7, 2026

(54) AIMING DEVICE WITH A DIFFRACTIVE OPTICAL ELEMENT AND REFLECTIVE IMAGE COMBINER

(71) Applicant: Marsupial Holdings, Inc., Waitsfield, VT (US)

(72) Inventor: William P. Parker, Waitsfield, VT (US)

(73) Assignee: Marsupial Holdings, Inc., Waitsfield, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,736

(22) Filed: Dec. 13, 2023

(65) Prior Publication Data

US 2024/0111170 A1     Apr. 4, 2024

Related U.S. Application Data

(63) Continuation of application No. 18/000,827, filed as application No. PCT/US2021/037696 on Jun. 16, 2021, now Pat. No. 11,852,842.

(Continued)

(51) Int. Cl.
*G02B 27/42* (2006.01)
*F41G 1/30* (2006.01)
(Continued)

(52) U.S. Cl.
CPC ......... *G02B 27/4205* (2013.01); *G02B 23/04* (2013.01); *G02F 1/292* (2013.01); *G09G 3/001* (2013.01); *F41G 1/30* (2013.01)

(58) Field of Classification Search
CPC .... G02B 27/4205; G02B 23/04; G02B 23/14; G02B 27/34; G02B 27/4233; G02F 1/292; G09G 3/001; F41G 1/30
See application file for complete search history.

(56) References Cited

U.S. PATENT DOCUMENTS 4,873,653 A * 10/1989 Grosskopf ............. G02B 21/00
                                                        359/371
6,392,812 B1 * 5/2002 Howard ............. G02B 27/0101
                                                        348/115

(Continued)

FOREIGN PATENT DOCUMENTS

WO          2015081313 A2      6/2015

*Primary Examiner* — David D Davis
(74) *Attorney, Agent, or Firm* — Downs Rachlin Martin PLLC

(57) ABSTRACT

A diffractive optic reflex sight (DORS) is provided for aiming devices in which a virtual image, such as a reticle, is produced and appears in the distance of a user's view when looking through the reflex sight. A light source illuminates a diffractive optical element (DOE) that includes a modulation pattern that generates a patterned illuminations corresponding with the virtual image. A reflective image combiner then reflects the patterned illumination so that the virtual image appears in the distance of the viewer's view. The DORS optical design system is mechanically and optically stable for precision aiming across a range of environmental conditions and in different use scenarios or applications including use in rapidly changing temperatures, varying light conditions, and a wide range of user proficiencies. The DORS optical design system is a readily manufacturable aiming and sighting device for a wide range of applications from handguns to astronomical telescopes.

5 Claims, 4 Drawing Sheets

Related U.S. Application Data

(60) Provisional application No. 62/705,215, filed on Jun. 16, 2020.

(51) Int. Cl.

| | | |
|---|---|---|
| *G02B 23/04* | (2006.01) | |
| *G02F 1/29* | (2006.01) | |
| *G09G 3/00* | (2006.01) | |

(56) References Cited

U.S. PATENT DOCUMENTS

| | | | | |
|---|---|---|---|---|
| 6,819,469 | B1 | 11/2004 | Koba | |
| 11,852,842 | B2 * | 12/2023 | Parker ................ | G02B 27/4233 |
| 2006/0055994 | A1 | 3/2006 | Schwerdtner | |
| 2006/0164704 | A1 | 7/2006 | Sieczka et al. | |
| 2006/0236585 | A1 | 10/2006 | Houde-Walter | |
| 2009/0020714 | A1 * | 1/2009 | Slinger ................. | H04N 25/00 |
| | | | | 250/550 |
| 2010/0202725 | A1 * | 8/2010 | Popovich ........... | G02F 1/13731 |
| | | | | 385/10 |
| 2012/0033195 | A1 * | 2/2012 | Tai .......................... | F41G 3/165 |
| | | | | 359/633 |
| 2012/0218481 | A1 * | 8/2012 | Popovich ............ | G02B 5/1819 |
| | | | | 349/11 |
| 2016/0004090 | A1 * | 1/2016 | Popovich ............... | G02F 1/292 |
| | | | | 359/567 |
| 2016/0327366 | A1 | 11/2016 | Campean | |
| 2017/0104556 | A1 * | 4/2017 | Locke ................. | H04M 11/062 |
| 2017/0176338 | A1 * | 6/2017 | Wu .................... | G01N 21/6428 |
| 2017/0211910 | A1 * | 7/2017 | Olmsted ................... | F41G 1/35 |
| 2020/0011638 | A1 | 1/2020 | Mills et al. | |

* cited by examiner

204

208

Figure 4:
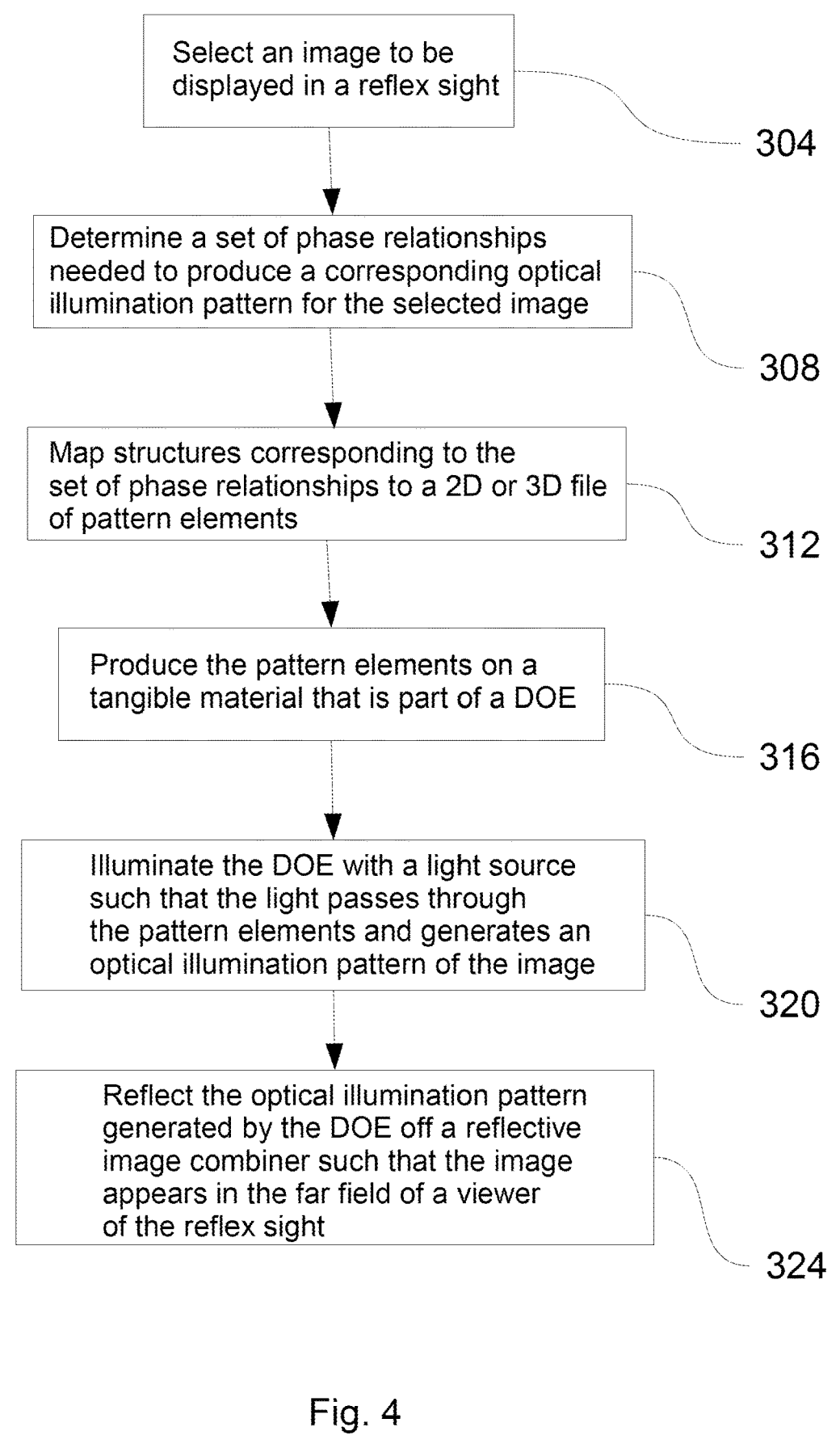

Select an image to be
displayed in a reflex sight

— 304

Determine a set of phase relationships
needed to produce a corresponding optical
illumination pattern for the selected image

— 308

Map structures corresponding to the
set of phase relationships to a 2D or 3D file
of pattern elements

— 312

Produce the pattern elements on a
tangible material that is part of a DOE

— 316

Illuminate the DOE with a light source
such that the light passes through
the pattern elements and generates an
optical illumination pattern of the image

— 320

Reflect the optical illumination pattern
generated by the DOE off a reflective
image combiner such that the image
appears in the far field of a viewer
of the reflex sight

AIMING DEVICE WITH A DIFFRACTIVE OPTICAL ELEMENT AND REFLECTIVE IMAGE COMBINER

RELATED APPLICATION DATA

This application is a continuation of U.S. patent application Ser. No. 18/000,827, filed Dec. 6, 2022, entitled "Aiming Device with a Diffractive Optical Element and Reflective Image Combiner," which is a U.S. National Phase of International Application No. PCT/US2021/037696, filed Jun. 16, 2021, and entitled "Diffractive Optic Reflex Sight," which application claims the benefit of priority of U.S. Provisional Patent Application Ser. No. 62/705,215, filed Jun. 16, 2020, and titled "Diffractive Optic Reflex Sight." Each of which is incorporated herein by reference in its entirety.

FIELD OF THE INVENTION

The present invention generally relates to aiming devices. In particular, the present invention is directed to a diffractive optic reflex sight.

BACKGROUND

There are several types of optical aiming devices such as gunsights that enable a user of a weapon, such as a pistol, rifle, shotgun, or handgun, to more accurately aim these weapons. Examples of such optical aiming and sighting devises include aiming lasers, telescopic sights, spotting scopes, reflection "reflex" or "red dot" sights, and sights which incorporate holographic images of various one and two-dimensional reticle patterns ("holographic sights").

Gunsights based on an illuminated reticle and a reflective collimating optical system have been known since the early 1900's. These devices have included an optical element that acts as an image combiner that enables the viewing of an illuminated reticle pattern or a "red dot" co-aligned with a target and appearing to be at approximately the same distance as the target or, for ease of manufacture and use, can be set to appear at infinity. This optical element is most often a curved partially reflective surface that receives and relays to the user's eye the light from a source such as an LED placed at the focus of the curved reflector. In place of a curved reflector and flat surface, a lens may be used, or other methods such as a holographic optical element acting as an image relay or reflective element.

Reflex optical systems may have a shape defining element between the light source and the image combiner, such as a shadow mask that defines a dot or any of a variety of reticle patterns (e.g., a cross, chevron, circle, etc.). For these systems, the partially transparent shadow mask would be at the focus of the curved reflector so that the user sees a clear, well defined and bright pattern visually overlaying the target. An example of a gunsight with reticle produced by a shadow mask and a reflective image combiner may be found in U.S. Pat. No. 5,901,452 assigned to Remington Arms. In an alternate approach, a reflective reticle could be used to shape the light into a pattern.

Previous methods of making transmission shadow mask reticles utilize a process of defining transparent regions in an otherwise opaque mask. Examples of processes to create a shadow mask are described in U.S. Pat. No. 10,324,372. In other examples of shadow mask reticles, the desired pattern can be formed with a fixed mask, such as a stencil or a silhouette, or it can be formed with an adjustable mask, such as a transmission or reflective LCD display.

SUMMARY OF THE DISCLOSURE

A diffractive optic reflex sight includes a light source, a DOE image generator configured to receive light from the light source, wherein the DOE image generator is substantially optically transmitting with respect to light received from the light source, wherein the DOE image generator includes a modulation pattern, and wherein the modulation pattern is derived from an intended virtual image such that when light passes through the modulation pattern a patterned illumination is formed that corresponds to the intended virtual image. A reflective image combiner is configured to receive the patterned illumination from the DOE image generator and to reflect the patterned illumination such that the virtual image is viewable in the distance by a user looking through the diffractive optic reflex sight.

Additionally or alternatively, the modulation pattern is determined by calculating an inverse Fourier transform of the intended virtual image.

Additionally or alternatively, no additional optical power is required to make the image focus at infinity.

Additionally or alternatively, the reflective image combiner is a partially reflective curved mirror.

Additionally or alternatively, the reflective image combiner is a partially reflective flat mirror.

Additionally or alternatively, the reflective image combiner is a holographic optical element.

Additionally or alternatively, the modulation pattern is a phase modulation pattern, wherein the DOE includes an array of switchable optical elements, wherein each pixel in the array has a random access addressability, and wherein the modulation pattern is established by switching each pixel on or off.

Additionally or alternatively, the array is a liquid crystal cell with a plurality of transparent electrodes configured to electrically modify an index of refraction of a liquid crystal layer covering the phase modulation pattern on the DOE.

Additionally or alternatively, the modulation pattern is a binary pattern with amplitude modulation.

Additionally or alternatively, the modulation pattern is a binary pattern with phase modulation.

Additionally or alternatively, the modulation pattern is imprinted on the DOE using a plurality of different surface levels.

Additionally or alternatively, the plurality of different surface levels includes 32 different levels.

In another aspect of the invention, a method for generating a reflex sight image includes determining an intended virtual image to be shown in the distance of a user's view when the user looks through a reflex sight, determining a set of phase relationships based on the intended virtual image that result in a patterned illumination for the intended virtual image when light passes through a modulation pattern corresponding to the set of phase relationships, mapping a set of corresponding structures to the set of phase relationships in a 2- or 3-dimensional file, imprinting the 2- or 3-dimensional file on a DOE, and passing light through the DOE such that the patterned illumination that forms the intended virtual image is generated.

Additionally or alternatively, the method further includes reflecting the patterned illumination from a reflective image combiner.

Additionally or alternatively, the determining a set of phase relationships includes calculating an inverse Fourier transform of the intended virtual image.

Additionally or alternatively, the modulation pattern is a phase modulation pattern, and further including switching on or off each pixel in an array of switchable optical elements on the DOE to form the modulation pattern.

Additionally or alternatively, the imprinting includes generating opaque and clear areas on the DOE.

Additionally or alternatively, the imprinting includes generating a plurality of different levels on a surface of the DOE.

Additionally or alternatively, the imprinting includes generating 32 different levels on the surface of the DOE.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a process diagram for generating an image for a reflective sight in accordance with an embodiment of the current invention.

DESCRIPTION OF THE DISCLOSURE

A diffractive optic reflex sight (DORS) system is provided for a gunsight or other uses in which an illuminated pattern, such as a reticle, is produced for an aiming device that utilizes a light source and a pattern generating diffractive optical element (DOE) together with a reflective image combiner. Optics of reflective sighting devices are also described that are optimized for use in a DORS optical design system.

The DORS system is mechanically and optically stable for precision aiming across a range of environmental conditions and in different use scenarios or applications including use in rapidly changing temperatures, in varying light conditions, and by users with a wide range of proficiencies. The DORS system is a readily manufacturable aiming and sighting device for a wide range of applications from handguns to astronomical telescopes.

The DORS system for generating an illuminated reticle pattern may include a DOE to shape light into a pattern based on light diffraction.

Figure 1:
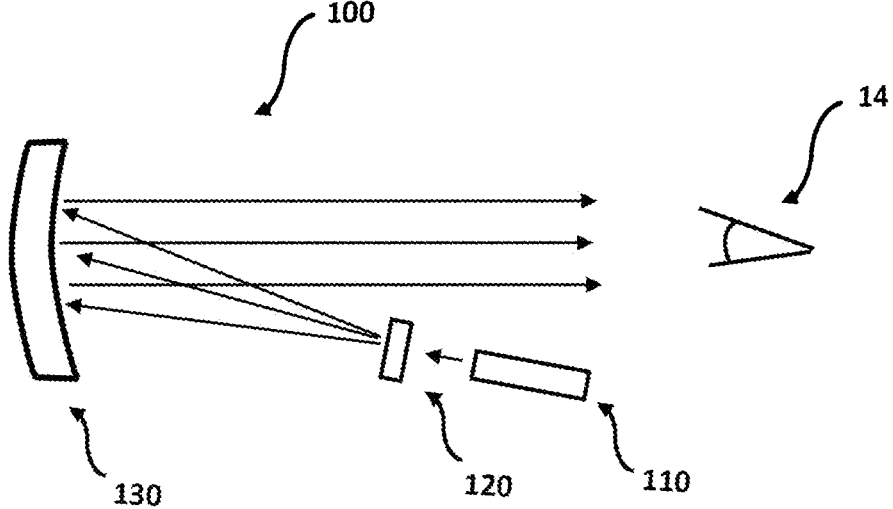
FIG. 1 is a schematic of an optical sighting device showing light paths in accordance with an embodiment of the present invention.

An exemplary DORS system, such as optical sighting device 100, is shown schematically in FIG. 1 and includes a light source 110, a DOE 120, and a reflective element 130. DOE 120 is used to produce multiple laser beams from a single light source or to project patterns in the far field of the DOE. Diffractive optical elements for these purposes may be produced using a number of methods. For example, in DOE 120, a microscale pattern of features is produced in the surface of DOE 120 that shift the phase in adjacent components of the light passing through DOE 120. The resulting surface utilizes the phenomena of light diffraction to cause the illuminating light propagating vectors to take on new directions from their original directions of propagation. Because the diffracting surface features are very small, e.g., on the order of micrometers, a large number of new vectors can be generated from a single illumination wavefront, and a pattern can be assembled at some short distance from the DOE, and then continue to propagate as that pattern over a larger distance. In FIG. 1, the pattern is reflected off reflective element 130 toward a user 14. No lenses or other means of providing optical power are required to make the pattern focus at infinity. The DOE can function to produce the desired pattern with a non-collimated light source, like an LED, or with a collimated source, such as a laser.

Because a DOE can be largely optically transmitting and produces the pattern by redirecting sub-elements of the light from the light source, instead of partially blocking the light as in the partially opaque shadow mask reticle generators of the prior art, it is a highly efficient method of producing an illuminated reticle pattern. This allows the DORS optical design system to generate a sighting device while using less energy compared to other techniques of producing reticles that block some of the illumination. In this way, the DORS system may allow for longer battery life.

Figure 2:
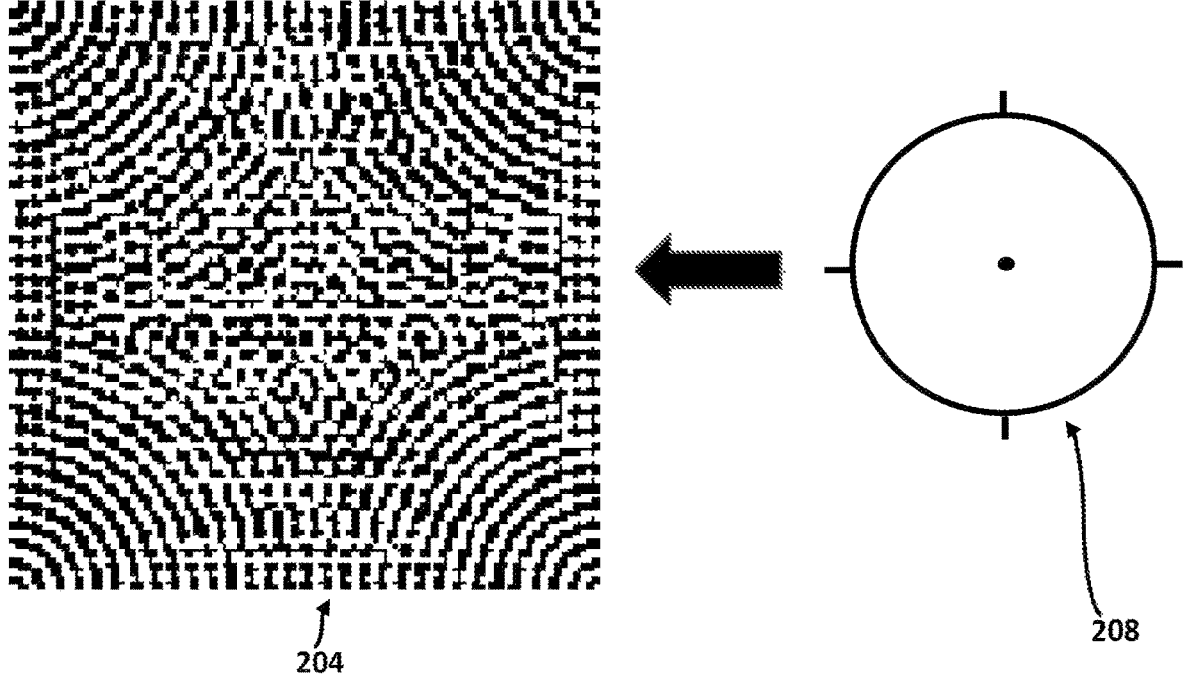
FIG. 2 shows a diffractive optical element pattern with the image produced when it is illuminated in accordance with an aspect of the present invention.

A DOE pattern that will result in a desired pattern upon illumination can be generated by determining a set of phase relationships needed to produce a desired patterned illumination and mapping the corresponding structures in a 2- or 3-dimensional file. The file can be composed of individual pattern elements (referred to herein as pixels) that are arranged in an array in which each pixel provides some degree of transmission and/or phase shift to the light illuminating the array. An example of a DOE pattern 204 and a resulting image/reticle pattern 208 of light from the light source propagating through pattern 204 in a DORS system are illustrated in FIG. 2. In this example, DOE pattern 204 is determined by calculating the inverse Fourier transform of the intended reticle image, such that when the pattern is imprinted on a DOE and illuminated by a light source, the Fourier transform is produced, resulting in an optical illumination patten that appears after reflection as the image in the far field of a user looking through the sight.

After computation of the desired diffractive structure, a principal pattern can be produced and turned into a tangible principal in a durable material using methods such as laser inscribing, photolithography, electron beam lithography, interference lithography, or ion beam patterning. Although producing a principal DOE can be relatively time consuming and expensive, once produced the principal DOE can be copied or reproduced using an inexpensive method such as injection molding, embossing, or stamping into a polymer film. The methods of producing a reproduction DOE are generally cheaper than the methods used to produce traditional shadow mask reticles such as etching, mechanical stencil, laser cutting or electroplating.

The optical configuration for DORS includes a light source, a DOE pattern generator, and a reflective image combiner, and each of these components can be implemented in a variety of ways with varying impact on the performance of the DORS.

The light source used in the DORS system may be any suitable light source, including a LED. LED illumination has advantages of long battery life and low production costs. A small LED source size with very high brightness may have run times of several hundred to many thousands of hours from a compact "coin" or "button" primary cell or small rechargeable battery. Because the lifetime is so great, the LED source size can be further reduced with an aperture in order to improve the spatial coherence of the light, or bandpass filter to define the spectral bandwidth of the light, and in doing so make a better quality image using a DOE without sacrificing operating lifetime on the battery. Additional electronic circuitry may be used to control the LED brightness, e.g., to automatically adjust for ambient or target brightness and/or automatically turn it off when not in use, which can further increase battery life.

Another light source is a laser, which produces light that is largely coherent and monochromatic, and compared to an LED source has an advantage of higher brightness and a smaller source size such that higher resolution features can be produced in the reticle pattern projected by the DOE, and that can have higher image contrast.

The DOE used in the DORS systems may have a binary DOE pattern, as shown in FIG. 2, which can have amplitude modulation (opaque or clear areas) or phase modulation (phase shift or no phase shift), with the primary difference between these being the diffraction efficiency of the resulting DOE (approximately 13% and 40% respectively). Other methods of generating a pattern with DOE's include using multilevel patterns with as many levels as can conveniently be produced in the manufactured DOE. These DOEs can have higher efficiency and have better overall performance. For example, an eight level DOE could have diffraction efficiency exceeding 80%. In an example, a 32-level pattern is used with greater than 90% diffraction efficiency.

Figure 3:
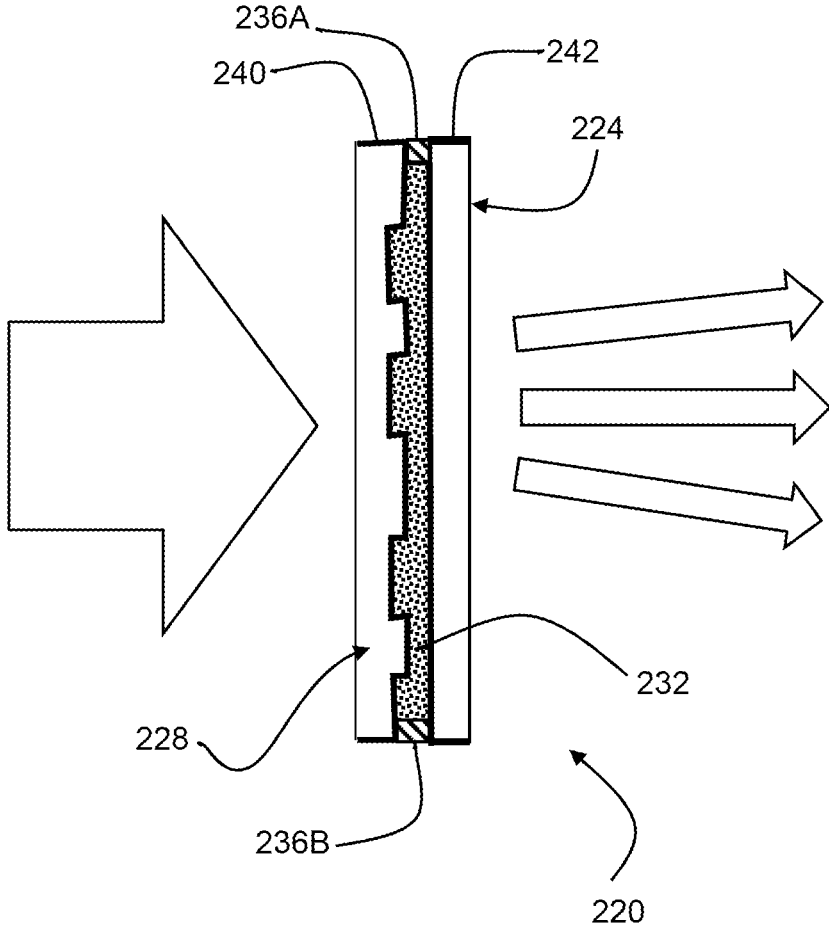
FIG. 3 is a cross sectional view of a switchable optical element in accordance with an aspect of the present invention.

Switchable optical elements (SOE), such as an electrically addressed liquid crystal (LC) cell that contains a phase DOE and transparent electrodes to electrically modify the index of refraction of a liquid crystal layer covering the phase DOE, can alternate between patterns with electrical addressing of the entire DOE pattern or specific areas of the DOE pattern. An SOE can have a single pattern (e.g., a circle) or, by changing the drive voltage, can switch between the source (dot) and pattern that is only partially on (dot with a circle around it). This can also be accomplished using a pixel-based LC cell in which each pixel in the array has a random access addressability such that a pattern can be established with any pixel being switched on or off, or at various voltage levels between on and off, and thus produce any pattern that is supported by the size and density of the array in both binary or multiple phase levels. In this way, patterns may be generated for different images An exemplary SOE 220 is shown schematically in FIG. 3 and includes a cover 224, such as glass, and a diffractive optic pattern layer 228 opposite cover 224. A liquid crystal layer 232 is sealed between cover 224 and diffractive optic pattern layer 228 with seals 236 (e.g., 236A, 236B). Transparent conductive layers are disposed on each side of liquid crystal layer 232, with a transparent conductive layer 240 between cover 224 and liquid crystal layer 232 and a second transparent conductive layer 242 between liquid crystal layer 232 diffractive optic pattern layer 228.

In operation, illumination light (depicted as large arrow in FIG. 3) is passed through SOE 220 and patterned illumination (depicted as smaller arrows in FIG. 3) emerges on the other side based on interaction with diffractive optic layer 228. The illumination pattern may be changed when voltage is applied to liquid crystal layer 232 through transparent conductive layer 240 and second transparent conductive layer 242. Thus, by controlling the applied voltage, the image shown in the reflex site can be altered.

The reflective image combiner may be a partially reflective flat mirror, which can provide an image of the DOE pattern that has a field of view (FOV) and eye-box that are limited by the size and diffraction angle of the projected DOE pattern when it is viewed by the user. The mirror coating can be chosen such that the reflection is optimized for the spectral bandwidth of the light source, including limiting the bandwidth with a narrow band coating. By limiting the bandwidth reflected by the partial mirror, other colors are not affected and the user sees the scene viewed through the DORS, including any targets, with a minimum amount of additional coloration.

The reflective image combiner may also be a partially reflective curved mirror, which can provide optical power to the image that can expand the size of the image and make a larger FOV and larger eye-box. In this way, the user can see a reticle that is easier to acquire quickly and that is less prone to "winking out" as the user's eye moves. As with the reflective flat mirror, a mirror coating can be chosen to optimize reflection of the light source bandwidth and minimize affecting the color information in the target scene. In order to further expand or reduce the observed size of the reticle pattern, a lens or combination of lenses can be used with the DOE projection and either the flat or curved reflective image combiner.

A holographic optical element (HOE) or other holographic wavefront recording can act as a mirror for specific wavelengths at specific angles that are defined at the time the HOE is produced. This can include making the HOE with a desired optical power as well as having unique playback angles that are not normally supported by a traditional reflective surface. In this variant of the DORS, a HOE recording is made in a photographic emulsion, photopolymer, or other holographic medium with an equivalent optical power to a curved mirror. This HOE recording could include an equivalent curvature that acts as a spherical, ellipsoidal, parabolic or other curved shaped mirror surface. Production methods to make this kind of reflective HOE with optical power are described, for example, in U.S. Pat. No. 6,906, 836.

In FIG. 4, a process is outlined for generating an image for a reflective sight. At step 304, the image to be displayed through the site is selected. A set of phase relationships for producing corresponding patterned illumination for the selected image is determined at step 308. This may include taking an inverse Fourier transform of the selected image. At step 312, structures corresponding to the set of phase relationships are mapped in a 2D or 3D file of pattern elements. These pattern elements are then transferred onto a part of a DOE at step 316, such as in the form of pixels, such as opaque areas and transparent areas on a surface of the DOE or in the form of different levels on the surface of the DOE. The portion of the DOE including the imprinted pattern elements is illuminated with light from a light source at step 320 such that the light passes through the pattern elements and generates a patterned illumination of the image. At step 324, the patterned illumination generated by the DOE is reflected off a reflective image combiner such that the image appears in the far field of a viewer looking through the reflex sight.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A diffractive optic reflex sight comprising:
   a light source;
   a diffractive optical element (DOE) image generator configured to receive light from the light source, wherein the DOE image generator is substantially optically transmitting with respect to light received from the light source, wherein the DOE image generator includes an embedded modulation pattern, and wherein the embedded modulation pattern is derived from an intended virtual image such that, when light passes through the modulation pattern, a patterned illumination is formed that corresponds to the intended virtual image; and a reflective image combiner configured to receive the patterned illumination from the DOE image generator and to reflect the patterned illumination such that an image of the intended virtual image is viewable in the distance of a viewer's view when the viewer is looking through the diffractive optic reflex sight, wherein the modulation pattern is a phase modulation pattern, wherein the DOE includes an array of switchable optical elements, wherein each pixel in the array has a random access addressability, and wherein the modulation pattern is established by switching each pixel on or off.

2. The diffractive optic reflex sight of claim 1, wherein the array is a liquid crystal cell with a plurality of transparent electrodes configured to electrically modify an index of refraction of a liquid crystal layer covering the phase modulation pattern on the DOE.

3. A sighting system comprising:

a light source;

a diffractive optical element (DOE) image generator configured to receive light from the light source, wherein the DOE image generator is substantially optically transmitting with respect to light received from the light source, wherein the DOE image generator includes an embedded modulation pattern, and wherein the modulation pattern is determined by a set of phase relationships based on an intended virtual image that result in a patterned illumination that produces the intended virtual image when light passes through a pattern corresponding to the set of phase relationships; and a reflective image combiner configured to receive the patterned illumination from the DOE image generator and to reflect the patterned illumination such that an image of the intended virtual image is viewable in the distance of a viewer's view when the viewer is looking through the sighting system, wherein the set of phase relationships are mapped in a 2- or 3-dimensional file and the 2- or 3-dimensional file is imprinted on the DOE image generator to form the embedded modulation pattern.

4. The sighting system of claim 3, wherein the embedded modulation pattern is a phase modulation pattern.

5. The sighting system of claim 4, wherein the embedded modulation pattern includes opaque and clear areas on the DOE image generator.

* * * * *